US011972875B2

United States Patent
Borukhin et al.

(10) Patent No.: US 11,972,875 B2
(45) Date of Patent: Apr. 30, 2024

(54) X-RAY OPTICAL ARRANGEMENT

(71) Applicant: CONVERGENT R.N.R. LTD, Tirat Carmel (IL)

(72) Inventors: Shirly Borukhin, Atlit (IL); Michael Kleckner, Ramat-Yishai (IL); Aharon Bar-David, Nesher (IL); Zeev Harel, Kfar Saba (IL)

(*) Notice: Subject to any disclaimer, the term of this patent is extended or adjusted under 35 U.S.C. 154(b) by 232 days.

(21) Appl. No.: 17/762,477

(22) PCT Filed: Sep. 23, 2020

(86) PCT No.: PCT/IL2020/051039
§ 371 (c)(1),
(2) Date: Mar. 22, 2022

(87) PCT Pub. No.: WO2021/059271
PCT Pub. Date: Apr. 1, 2021

(65) Prior Publication Data
US 2022/0351874 A1    Nov. 3, 2022

Related U.S. Application Data
(60) Provisional application No. 62/904,716, filed on Sep. 24, 2019.

(51) Int. Cl.
*G21K 1/06* (2006.01)
*B23H 7/02* (2006.01)
*B23H 9/00* (2006.01)

(52) U.S. Cl.
CPC ............. *G21K 1/06* (2013.01); *B23H 7/02* (2013.01); *B23H 9/008* (2013.01); *G21K 2201/062* (2013.01)

(58) Field of Classification Search
None
See application file for complete search history.

(56) References Cited

U.S. PATENT DOCUMENTS 3,927,319 A * 12/1975 Wittry ................ G21K 1/06
378/85
6,285,506 B1    9/2001 Chen
(Continued)

FOREIGN PATENT DOCUMENTS

| CN | 101138869 A | 8/2008 |
| WO | WO2019003229 A1 | 1/2019 |

OTHER PUBLICATIONS

PCT International Search Report for International Application No. PCT/IL2020/051039, dated Jan. 10, 2021, 6pp.
(Continued)

*Primary Examiner* — Hoon K Song
(74) *Attorney, Agent, or Firm* — The Roy Gross Law Firm, LLC; Roy Gross (57) ABSTRACT

A method of manufacturing burr-edged reflecting tile elements for a mosaic X-ray lens configured for forming an X-ray beam comprises steps of: (a) providing a single crystal having first and second faces thereof being parallel therebetween; single crystal having crystallographic planes thereof being parallel to first and second faces of the single crystal; the first face dedicated for reflecting an X-ray beam to be incident thereto; (b) cutting the single crystal by means of a wire electrical discharging machine normally to the main faces. The step of cutting the single crystal comprises moving a wire within a cut in direction from the second face to the first face; such that burrs configured for reflecting the X-ray beam to be incident thereto are formed on edges of the cut.

3 Claims, 6 Drawing Sheets

(56) References Cited

U.S. PATENT DOCUMENTS

| | | | |
|---|---|---|---|
| 9,008,271 B2 | 4/2015 | Burshtein et al. | |
| 9,953,735 B2 | 4/2018 | Bar-David et al. | |
| 2003/0128811 A1* | 7/2003 | Verman | G21K 1/06 |
| | | | 378/84 |
| 2005/0201517 A1* | 9/2005 | Chen | G21K 1/06 |
| | | | 378/84 |
| 2009/0003517 A1* | 1/2009 | Yoneyama | G01N 23/207 |
| | | | 378/19 |
| 2013/0170625 A1 | 7/2013 | Burshtein et al. | |
| 2015/0248942 A1 | 9/2015 | Bar-David et al. | |
| 2015/0357069 A1* | 12/2015 | Yun | H01J 35/147 |
| | | | 378/84 |
| 2020/0072770 A1* | 3/2020 | Yun | G21K 1/062 |

OTHER PUBLICATIONS

PCT Written Opinion for International Application No. PCT/IL2020/051039, completed Jan. 10, 2021, 5pp.

Takino, H. et al. (2007). Contouring of polished single-crystal silicon plates by wire electrical discharge machining. Precision Engineering—journal of The International Societies for Precision Engineering and Nanotechnology—Precis Eng. 31. 358-363. 10.1016/j.precisioneng.2007.03.003.

Barrett, R., Baker, R.P., Cloetens, P., Dabin, Y., Morawe, C., Suhonen, H., Tucoulou, R., Vivo, A., & Zhang, L. (2011). Dynamically-figured mirror system for high-energy nanofocusing at the ESRF. Optical Engineering + Applications. DOI:10.1117/12.894735.

Extended European Search Report for European Patent Application No. 20867660.1, dated Nov. 7, 2022, 8pp.

* cited by examiner

X-RAY OPTICAL ARRANGEMENT

FIELD OF THE INVENTION

The present invention relates to X-ray optical arrangements and, more particularly, to mosaic lenses of enhanced intensity and sharpness of a formed focal spot.

BACKGROUND OF THE INVENTION

US2013/0170625 A1 and U.S. Pat. No. 9,953,735B2 and other patents disclose the X-ray lenses based on Bragg reflection and configured for forming customizable radiation patterns such as concentric and/or coaxial rings or any other shape.

Practically, the X-ray lenses based on Bragg reflections are made of single crystals. Strong requirements are applied to smoothness of the single crystal. In addition, the technology of bending these crystals is very laborious in practicing.

Curvilinear reflecting surfaces can be approximated by a mosaic structure made of a plurality of small planar tiles. The dimension of the planar tile defines the degree of approximation to the ideal reflecting surface to be provided. Deviation of planar tiles from the ideal reflecting surface results in enlarging and intensity reduction of a focal spot formed by the plurality of small planar tiles in comparison with the bent crystal.

Thus, there is a long-felt and unmet need for providing an X-ray mosaic lens having a sharpened focal spot of enhanced intensity.

SUMMARY TO THE INVENTION

It is hence one object of the invention to disclose a method of manufacturing burr-edged reflecting tile elements for a mosaic X-ray lens configured for forming an X-ray beam. The aforesaid method comprising steps of: (a) providing a single crystal having first and second faces thereof being parallel therebetween; single crystal having crystallographic planes thereof being parallel to first and second faces of said single crystal; said first face dedicated for reflecting an X-ray beam to be incident thereto; (b) cutting said single crystal by means of a wire electrical discharging machine normally to said main faces.

It is a core purpose of the invention to disclose the step of cutting said single crystal comprises moving a wire within a cut in direction from said second face to said first face such that burrs edging said cut are configured for reflecting said X-ray beam to be incident thereto.

Another object of this disclosure is to disclose an X-ray reflecting burr-edged tile for a mosaic X-ray lens configured for forming an X-ray beam. The aforesaid reflecting tile manufactured by method comprising steps described above.

A further object of this disclosure is to disclose an X-ray lens forming an X-ray beam. The aforesaid lens comprises a plurality of burr-edged crystal tiles with burrs manufactured by the method described above.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, so as to enable any person skilled in the art to make use of the invention and sets forth the best modes contemplated by the inventor of carrying out this invention. Various modifications, however, are adapted to remain apparent to those skilled in the art, since the generic principles of the present invention have been defined specifically to provide a method of manufacturing burr-edged reflecting tile elements for a mosaic X-ray lens configured for forming an X-ray beam, burr-edged reflecting tile elements and mosaic X-ray lenses manufactured by the aforesaid method.

According to the present invention, a method of manufacturing burr-edged reflecting tile elements for a mosaic X-ray lens configured for forming an X-ray beam is disclosed. A plurality of burr-edged reflecting tiles obtainable by the disclosed method can be arranged into an X-ray lens providing a sharper focal spot of higher intensity in comparison with a continuous curvilinear reflecting surface of an equivalent geometry. It should be emphasized that each burr-edged reflecting tile manufactured by the disclosed method converges the incident X-rays in an individual manner. Thus, a resulting focal spot is a superposition of focal spots created by the burr-edged reflecting tile forming the abovementioned X-ray lens.

Figure 1:
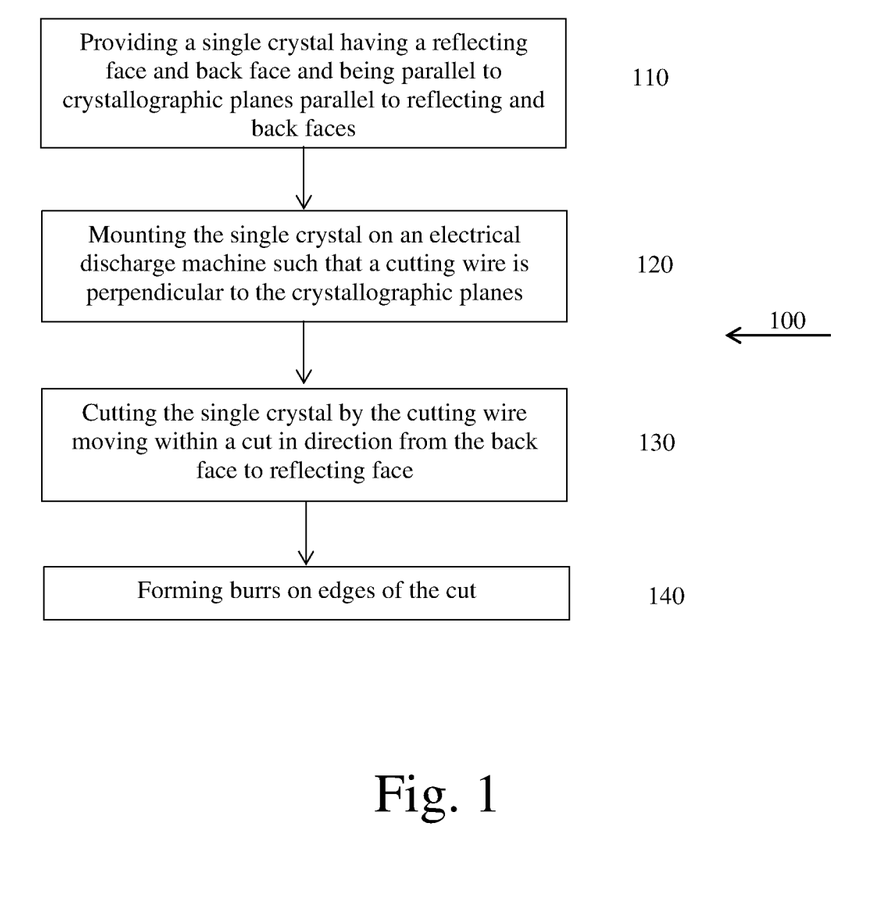
FIG. 1 is a flowchart of a method of manufacturing burr-edged reflecting tiles.

Reference is now made to FIG. 1 presenting method 100 of manufacturing burr-edged reflecting tiles. A single crystal to be processed is provided at step 110. The single crystal is characterized by parallel alignment of a face dedicated for reflection of X-rays, back face opposite to the reflecting face and crystallographic planes. The single crystal to be processed is mounted on an electrical discharge machine at step 120. The single crystal is oriented on a machine table such that a cutting wire is perpendicular to the crystallographic planes. During a cutting process (step 130), the cutting wire moves in a direction from the back face to the reflecting face. And therewith, burrs configured for reflecting said X-ray beam to be incident thereto are formed on edges of the cut (step 140).

Figure 2:
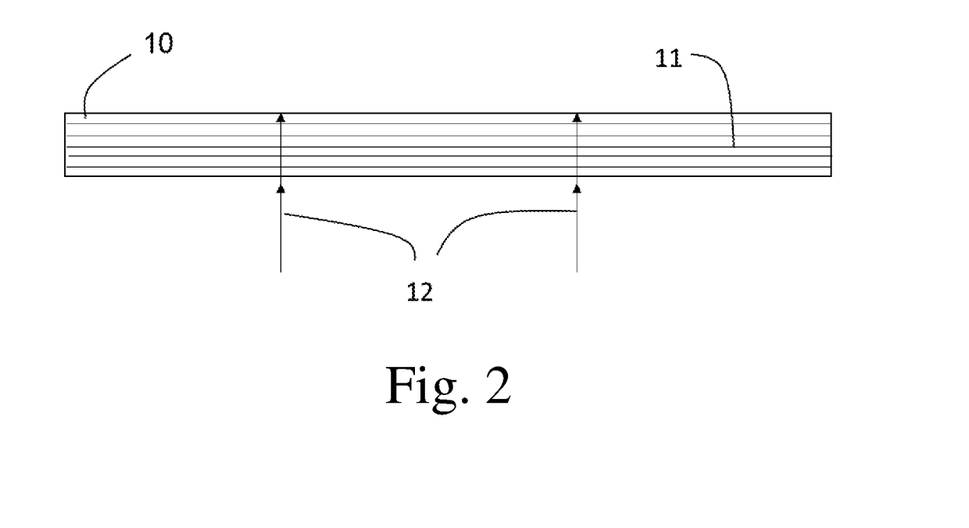
FIG. 2 is a schematic cross-sectional view of a large piece of a single crystal.

Reference is now made to FIG. 2 presenting a cross sectional view of a blank single crystal (10). The parallel lines 11 refer to crystallographic planes of single crystal 10. In many cases an accurate size is needed thus the large piece needs to be cut to smaller pieces.

Single crystal 10 is cut along cutting directions 12. It is the inherent property of the electric discharge technology to form burrs on the edges of the cuts obtained by means of the abovementioned technology.

Figure 3:
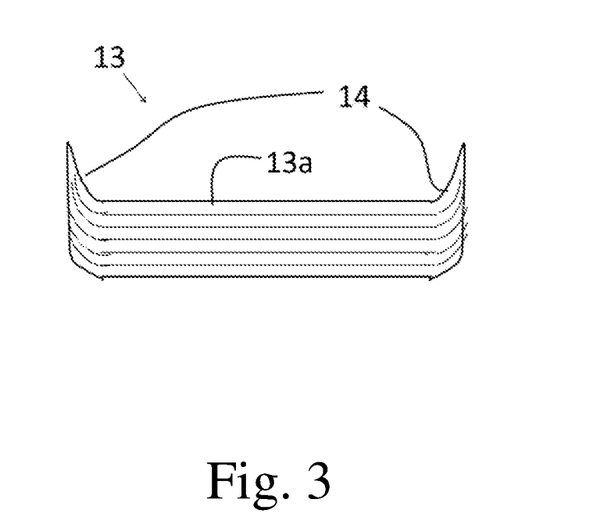
FIG. 3 is a schematic cross-sectional view of a burr-edged reflecting tile.

Reference is now made to FIG. 3 presenting a cross-sectional view of burr-edged reflecting tile element 13 edged by burrs 14. The size of the burrs is exaggerated for clarity. Element 13 is cut by means wire-EDM technology along the directions shown FIG. 1. The central portion of reflecting face 13a is configured for operation at Bragg angle A major use of crystal tiles is for X-ray Bragg reflection. Burr areas 14 located at the edges of element 13 provide enhanced reflection of the incident X-ray beam (not shown).

Figure 4A:
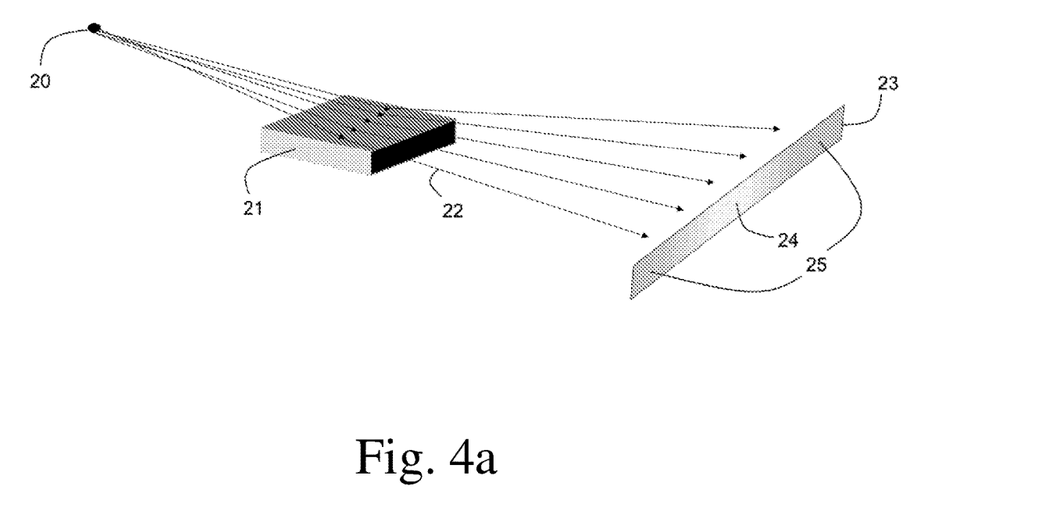
FIG. 4a is a 3-dimensional ray-tracing diagram of an X-ray beam formed by a planar single crystal tile without burrs.

Reference is now made to FIG. 4a presenting a 3-dimensional ray-tracing diagram of an X-ray beam formed by a planar single crystal tile without burrs. X-ray source 20 emits rays that are reflected from planar crystal 21 without burrs. Reflected rays 22 form a diverging beam. Intensity distribution in the reflected diverging beam are shown on plane 23. Higher intensity in the center of the beam is marked by bright color 24. Darker color 25 corresponds lower intensity at the periphery of the beam.

Figure 4B:
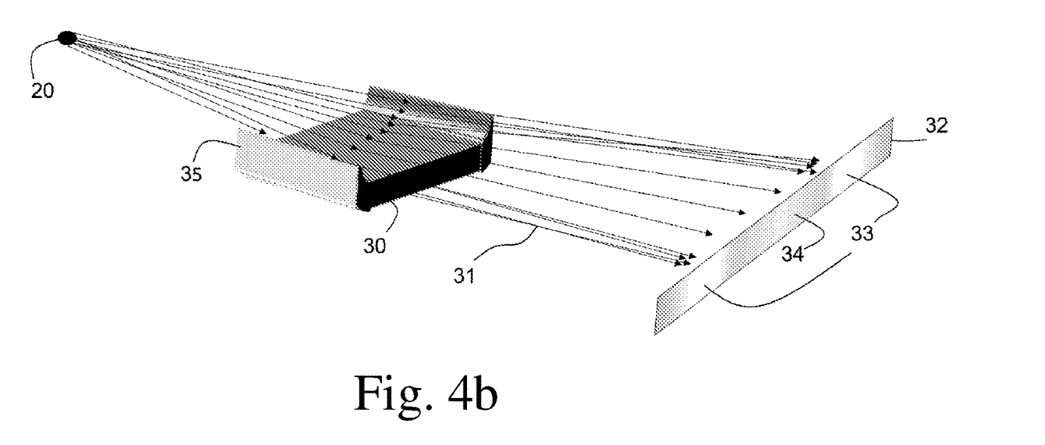
FIG. 4b is a 3-dimensional ray-tracing diagram of an X-ray beam formed by a burr-edged reflecting single crystal tile with burrs.

FIG. 4b presenting a 3-dimensional ray-tracing diagram of an X-ray beam formed by a planar single crystal tile 30 provided with burrs 35 on its edges disposed into a similar setup.

Intensity distribution is shown on plane 32. X-rays 31 reflected from the burr areas 35 at the edges deviate from the rays reflected by the central portion of tile 30 going towards area 34 on plane 32. Side areas 33 are characterized by higher intensity in comparison with the areas neighboring thereto and even exceeding the intensity at central area 34.

The width of areas 33 depends on the cutting methods, other types of treatment as explained above, the type of material, crystal thickness and other parameters.

If the tile is relatively wide, the high reflectivity appears in areas 33 as shown in FIG. 4b.

Making the tile narrow so that the burr's reflections at the sides become closer to each other results in two hot spots coinciding at the desired location and forming a high-intensity area in the middle at the desired location. Thus, adjustment of the tile width allows to control the location and width of the high-intensity areas.

Figure 5A:
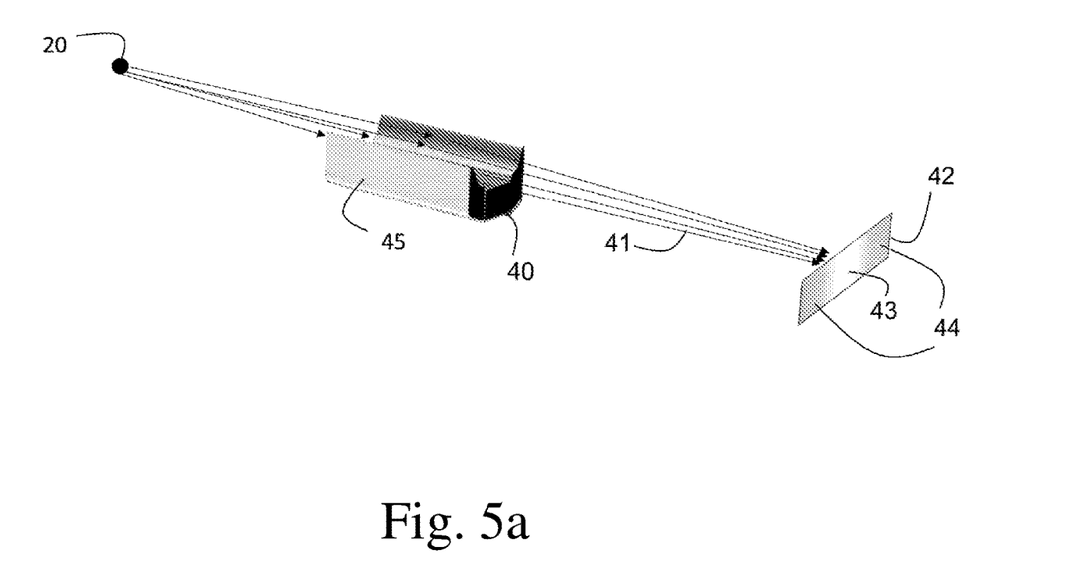
FIG. 5a is a 3-dimensional ray-tracing diagram of an X-ray beam of formed by a narrow burr-edged reflecting tile which focuses incoming x-ray.

Reference is now made to FIG. 5a presenting a 3-dimensional ray-tracing diagram of an X-ray beam of formed by a narrow burr-edged reflecting tile. Exemplary narrow tile 40 focuses x-rays coming from X-ray source 20. Burrs 45 are close to each other making the outgoing reflected x-rays 41 to converge to central area 43 on intensity plane 42. X-ray intensity in side areas 44 stay low. It should be emphasized that the embodiment depicted in FIG. 5a provides the highest intensity in central area 43 in comparison with other embodiments disclosed in the present application.

Figure 5B:
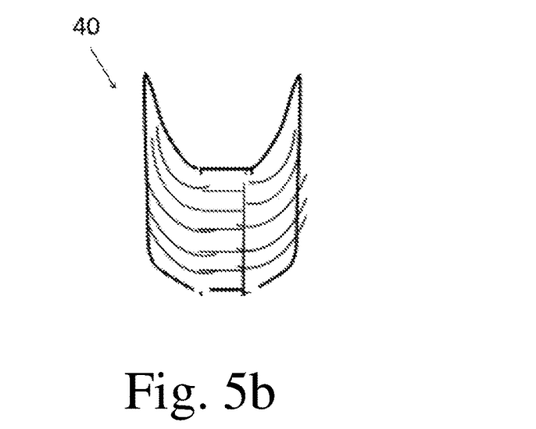
FIG. 5b is a schematic cross-sectional view of a burr-edged reflecting single crystal tile.

Reference is now made to FIG. 5b presenting a cross sectional view of single narrow tile 40. The size of the burrs is exaggerated for simplicity. It is possible to assemble a larger plane with a mosaic of plural number of narrow tiles with their burrs.

Figure 6A:
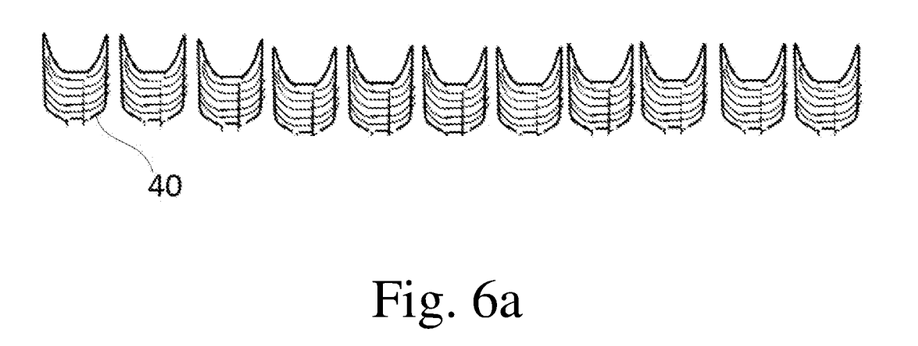
FIGS. 6a and 6b are is schematic cross-sectional views of exemplary arrangements of burr-edged reflecting single crystal tiles functioning as Xray lenses.
Figure 6B:
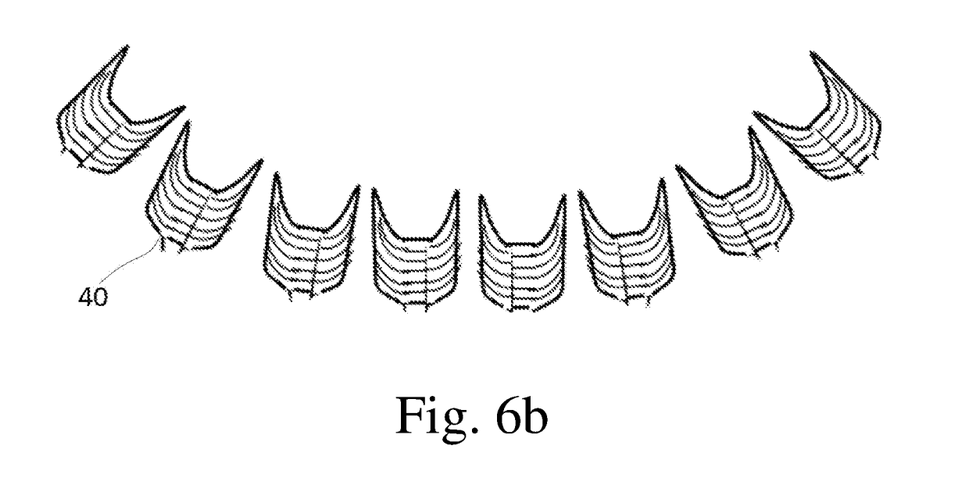

Reference is now made to FIGS. 6a and 6b presenting schematic cross-sectional view of exemplary arrangements of burr-edged reflecting single crystal tiles functioning as X-ray lenses. FIG. 6a illustrates a planarly-arranged embodiment while FIG. 6b shows a curvilinearly-arranged embodiment functioning as an X-ray lens usable in the system for X-ray irradiation of target volume disclosed in U.S. Pat. No. 9,008,271 or X-ray reflective lens arrangement disclosed in U.S. Pat. No. 9,953,735B2.

Figure 7A:
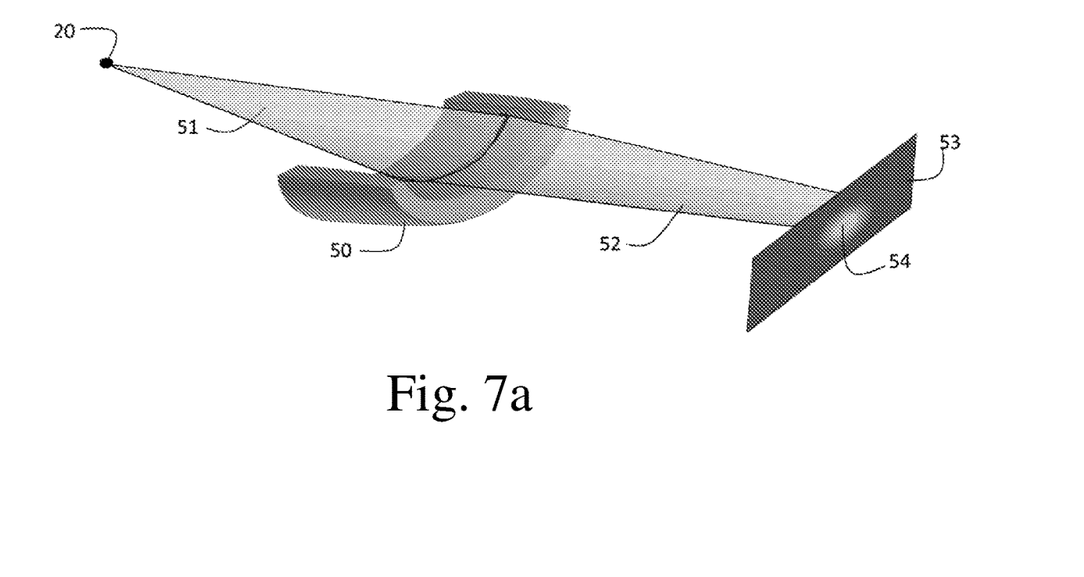
FIGS. 7a and 7b are 3-dimensional ray-tracing diagrams of X-ray beams formed by a continuous curvilinear reflecting surface and a plurality of burr-edged reflecting single crystal tiles, respectively.
Figure 7B:
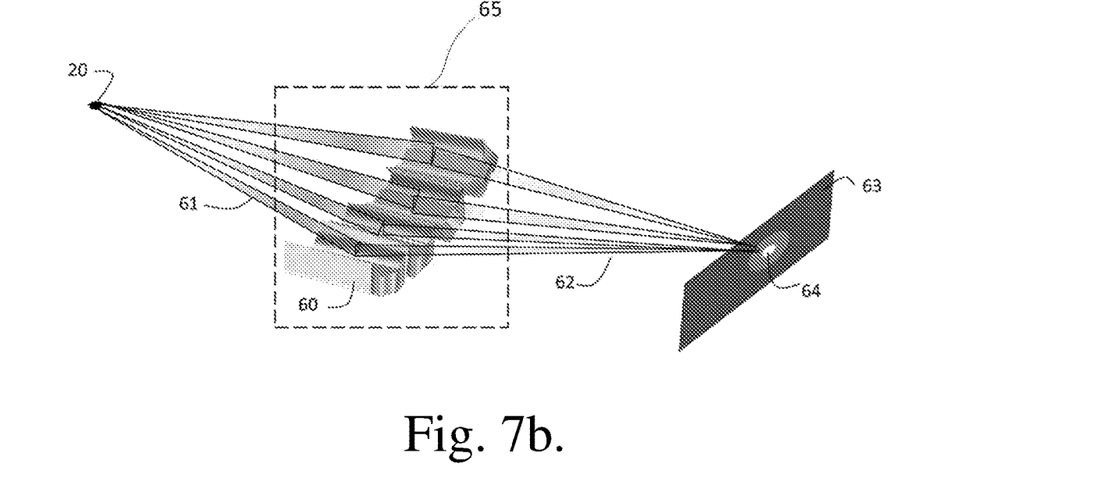

Reference is now made to FIGS. 7a and 7b presenting 3-dimensional ray-tracing diagrams of X-ray beams formed by smooth tiles forming a continuous curvilinear reflecting surface and a plurality of burr-edged reflecting single crystal tiles, respectively. FIG. 7a shows a section of a curved surface 50 belonging to an X-ray lens (not shown). Curved surface 50 is covered with crystals tiles without burrs which form approximately smooth surface configured for reflection of incoming X-rays 51 at Bragg angle. Reflected rays 52 are focused in focal spot 54 on plane 53. The size of the focal spot 54 is determined by following properties:
1) The quality of the crystal such as mosaicity and reflectivity of the material.
2) The size and shape of the planar surface of the individual tiles that determine:
   a. degree of approximation of the tile-mad lens to the smooth one; and
   b. exact location and mutual orientation of burr-edged tiles.
   c. Length, width and thickness of the individual tiles.

FIG. 7b shows a similar setup with a reflecting surface formed by tiles 60 provided with burrs. Rays 61 from source (20) are incident at tiles 60. Reflected rays 62 are focused into focal spot 64 on surface 63. It should be emphasized that each tile creates an independent convergent X-ray beam. Tiles 60 are arranged such that all focal spots individually created by tiles 60 are positioned in common focal spot 64 which surmounts the maximal intensity and sharpness of focal spot 54 obtainable in the setup shown in FIG. 7a.

Smooth lens 50 in FIG. 7a and lens 65 formed by a plurality of burr-edged tiles 60 in FIG. 7b, have an identical envelope and made of the same type of crystal. The lens 65 focuses the radiation into a sharper focal spot with higher intensity due to the converging property of each single tile. Thus, for converging purposes, reflectivity is enhanced. The focal spot 64 is sharper and brighter in comparison with focal spot 54 of smooth lens 50.

Lens 65 formed by a plurality of burr-edged tiles 60 advantageously differs from smooth lens 50 because focusing properties of each tile 60 can varied independently. Specifically, tile orientation and distance between the burrs allow to customize the intensity distribution on plane 63 (FIG. 7b).

The invention claimed is:

1. A method of manufacturing burr-edged reflecting tile elements for a mosaic X-ray lens configured for forming an X-ray beam; said method comprising steps of:
   a. providing a single crystal having first and second faces thereof being parallel therebetween; single crystal having crystallographic planes thereof being parallel to first and second faces of said single crystal; said first face dedicated for reflecting an X-ray beam to be incident thereto;
   b. cutting said single crystal by means of a wire electrical discharging machine normally to said main faces;
      wherein said step of cutting said single crystal comprises moving a wire within a cut in direction from said second face to said first face; such that burrs configured for reflecting said X-ray beam to be incident thereto are formed on edges of said cut.

2. An X-ray reflecting burr-edged tile for a mosaic X-ray lens configured for forming an X-ray beam; said reflecting tile manufactured by a method comprising steps of:

a. providing a single crystal having first and second faces thereof being parallel therebetween; single crystal having crystallographic planes thereof being parallel to first and second faces of said single crystal; said first face dedicated for reflecting an X-ray beam to be incident;

b. cutting said single crystal by means of a wire electrical discharging machine normally to said main faces;

wherein said step of cutting said single crystal comprises moving a wire within a cut in direction from said second face to said first face such that burrs edging said cut are configured for reflecting said X-ray beam to be incident thereto.

3. An X-ray lens forming an X-ray beam; said lens comprising a plurality of burr-edged crystal tiles with burrs, said plurality of reflecting tiles manufactured by a method comprising steps of:

a. providing a single crystal having first and second faces thereof being parallel therebetween; single crystal having crystallographic planes thereof being parallel to first and second faces of said single crystal; said first face dedicated for reflecting an X-ray beam to be incident;

b. cutting said single crystal by means of a wire electrical discharging machine normally to said main faces;

wherein said step of cutting said single crystal comprises moving a wire within a cut in direction from said second face to said first face such that burrs edging said cut are configured for reflecting said X-ray beam to be incident thereto.

* * * * *